(12) United States Patent
Marti et al.

(10) Patent No.: US 9,402,161 B2
(45) Date of Patent: Jul. 26, 2016

(54) PROVIDING PERSONALIZED CONTENT BASED ON HISTORICAL INTERACTION WITH A MOBILE DEVICE

(71) Applicant: Apple Inc., Cupertino, CA (US)

(72) Inventors: Lukas M. Marti, San Jose, CA (US); Xufeng Han, Chapel Hill, NC (US)

(73) Assignee: APPLE INC., Cupertino, CA (US)

( * ) Notice: Subject to any disclaimer, the term of this patent is extended or adjusted under 35 U.S.C. 154(b) by 78 days.

(21) Appl. No.: 14/339,104

(22) Filed: Jul. 23, 2014

(65) Prior Publication Data

US 2016/0029176 A1 Jan. 28, 2016

(51) Int. Cl.
*H04W 24/00* (2009.01)
*H04W 4/02* (2009.01)
(52) U.S. Cl.
CPC .................................. *H04W 4/028* (2013.01)
(58) Field of Classification Search
None
See application file for complete search history.

(56) References Cited

U.S. PATENT DOCUMENTS

| 7,526,458 B2 | 4/2009 | Flinn |
| 8,005,680 B2 | 8/2011 | Van Kommer |
| 2006/0156209 A1* | 7/2006 | Matsuura ............... G06Q 10/10 714/798 |
| 2010/0261485 A1* | 10/2010 | Fernandes ............... H04W 4/02 455/456.3 |
| 2013/0151148 A1 | 6/2013 | Parundekar |
| 2014/0012859 A1 | 1/2014 | Heilprin |

OTHER PUBLICATIONS

Paik, Woojin, et al., "Applying Natural Language Processing (NLP) Based Metadata Extraction to Automatically Acquire User Preferences," In Proceedings of the 1st international conference on Knowledge capture, 2001, ACM, pp. 116-122.
Stanford CoreNPL, Product Datasheet, [online], The Stanford Natural Language Processing Group, [retrieved on Jul. 24, 2014], retrieved from the Internet: <URL: http://nlp.stanford.edu/software/corenlp.shtml>, 6 pages.
U.S. Appl. No. 14/020,689, filed Sep. 6, 2013 (unpublished).
U.S. Appl. No. 14/022,099, filed Sep. 9, 2013 (unpublished).

* cited by examiner

*Primary Examiner* — Erika A Washington
(74) *Attorney, Agent, or Firm* — Kilpatrick Townsend & Stockton LLP

(57) ABSTRACT

Methods and computer products can provide personalized content based on historical interaction with a mobile device. A computing device can receive information about a user interaction with an application running on the mobile device at a first time and location. A type of the application can be identified by parsing a description of the application (e.g., using a natural language processing algorithm). An affinity model can be generated that associates the type of the application with the first time and/or location. At a second time and location, it can be determined that the second time corresponds to the first time and/or that the second location corresponds to the first location. Using the affinity model, the second time and/or location can be associated with the type of the application, and the mobile device may then display content related to the type of the application.

27 Claims, 10 Drawing Sheets

US 9,402,161 B2

PROVIDING PERSONALIZED CONTENT BASED ON HISTORICAL INTERACTION WITH A MOBILE DEVICE

BACKGROUND

The present disclosure relates generally to mobile devices and more particularly to providing personalized content based on historical user interaction with a mobile device.

Mobile devices such as smart phones, tablet computers, laptop computers, media players, and the like have become quite popular and play an integral role in our day-to-day lives. For instance, many users carry a mobile device almost everywhere they go and use their devices for a variety of purposes, including sending, receiving, and managing text messages and emails, reading news and other digital content, listening to audio, viewing videos, viewing maps, navigation (e.g., using such maps and/or a GPS receiver), purchasing items in stores (e.g., using contactless payment systems), making and receiving phone calls, playing games, accessing the Internet (e.g., to look up information), and other purposes. To facilitate such functionalities, computing devices typically utilize an operating system (OS) that can run various types of applications.

Despite the many functionalities provided by applications on a mobile device, the user experience may be limited by the fact that mobile devices generally do not take into account a user's historical interaction with such applications. Information such as a user's preferences and habits can be gleaned from past user interactions in combination with contextual information such as the time and/or location at which user interactions with applications occur. Such information may allow for recommendations and other personalized content to be provided by the mobile device to the user.

It is therefore desirable to provide methods and computer products that can provide personalized content to a user based on the user's historical interaction with applications on a mobile device.

BRIEF SUMMARY

Embodiments of the present invention can provide methods and computer products for providing personalized content based on historical interaction with a mobile device.

According to one embodiment, a method provides personalized content based on historical interaction with a mobile device at a location. A computing device receives information about a user interaction with an application running on the mobile device at a first time. A type of the application is determined by parsing a description of the application. A first location of the mobile device is determined, the mobile device being at the first location at the first time. An affinity model is generated that associates the type of the application with the first location. At a second time, it is determined that a second location of the mobile device corresponds to the first location, the mobile device being at the second location at the second time. Using the affinity model, it is determined that the second location is associated with the type of the application based on the correspondence of the second location to the first location. Content related to the type of the application is then be provided to the mobile device.

According to another embodiment, a method provides personalized content based on historical interaction with a user device at a time. A computing device receives information about a user interaction with an application running on the user device at a first time. A type of the application is determined by parsing a description of the application. An affinity model is generated that associates the type of the application with the first time, the affinity model being stored on the computing device. At a second time, it is determined that the second time corresponds to the first time. Using the affinity model, it is determined that the second time is associated with the type of the application based on the correspondence of the second time to the first time. Content related to the type of the application is then be provided to the user device.

According to another embodiment, a method provides personalized content based on historical interaction with a mobile device at a location and time. A computing device receives information about a user interaction with an application running on the mobile device at a first time. A type of the application is identified by parsing a description of the application. A first location of the mobile device is determined, the mobile device being at the first location at the first time. An affinity model is generated that associates the type of the location with the first location and the first time. At a second time, it is determined that a second location of the mobile device corresponds to the first location and that the second time corresponds to the first time, the mobile device being at the second location at the second time. Using the affinity model, it is determined that the section location is associated with the type of the application based on the correspondence of the second location to the first location, and that the second time is associated with the type of the application based on the correspondence of the second time to the first time. Content related to the type of the application is then provided to the mobile device.

Other embodiments are directed to systems, mobile devices, computer products, and computer readable media associated with methods described herein.

A better understanding of the nature and advantages of embodiments of the present invention may be gained with reference to the following detailed description and the accompanying drawings.

DETAILED DESCRIPTION

A user of a mobile device (e.g., a smartphone) may utilize many different applications running on their mobile device at various times and locations. In some instances, the user may regularly use a certain application at a particular time and/or location. For example, the user may regularly read the news on their mobile device using a news application at a coffee shop on weekdays around 9:00 am. As another example, the user may regularly play video game applications on Saturday mornings when they are at home. A user's preferences and habits can be gleaned from such patterns of application usage, time, and location.

Embodiments can be used to provide personalized content based on a user's historical interaction with particular types of applications (e.g., news, video games, weather, sports, etc.) in conjunction with the geographic locations (e.g., geographic coordinates, street address, city, state, country, etc.) or location attributes (e.g., coffee shop, work, home, beach, etc.) and/or the times (e.g., time of day, day of week, month, date, season, etc.) at which the application interactions occurred. As described in further detail below, such information can be analyzed and an affinity model generated for the user that associates an application type (e.g., news) with a location (e.g., coffee shop) and/or time (e.g., weekday mornings). Going forward, when the mobile device is at a location and/or time associated with the application type stored in the affinity model, the mobile device can automatically provide the user with content related to the type of application (e.g., news content).

I. Introduction

Figure 1:
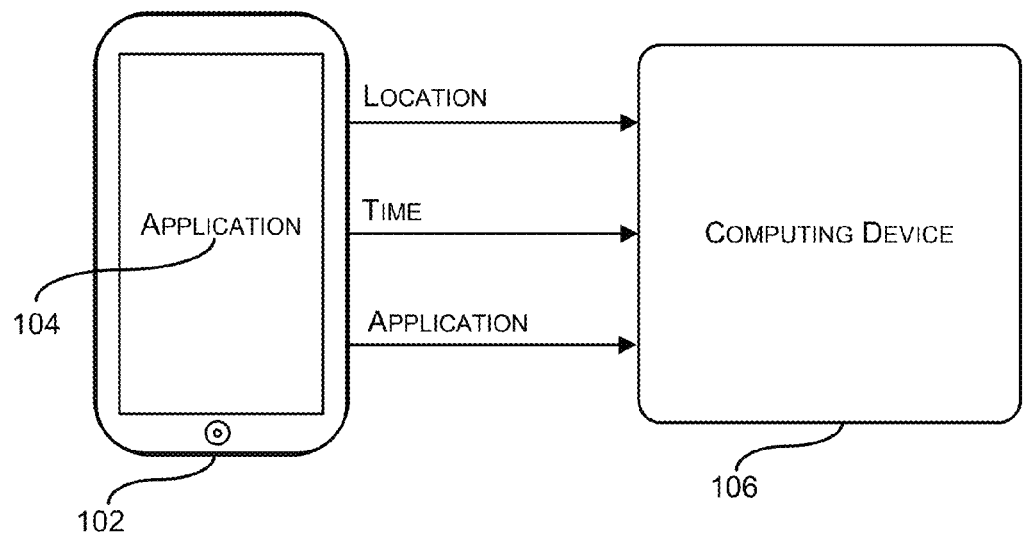
FIG. 1 is a diagram 100 showing a computing device that can provide personalized content based on historical interaction with a mobile device according to embodiments of the present invention.
Figure 1:
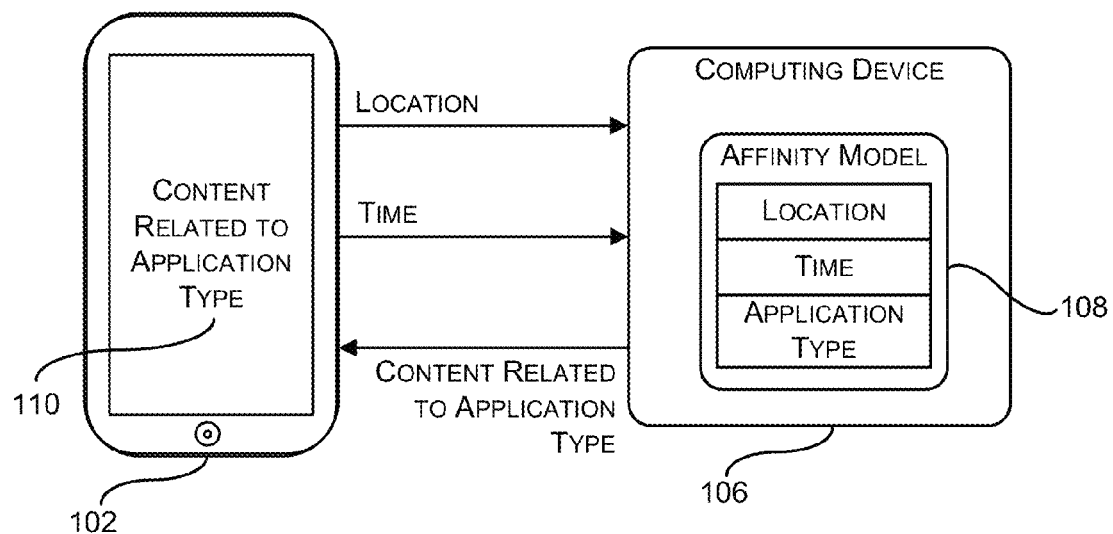

FIG. 1 is a diagram 100 showing a computing device 106 that can provide personalized content based on historical interaction with a mobile device 102 according to embodiments of the present invention. As illustrated in FIG. 1, when a user interacts with an application 104 running on the mobile device 102, information about the interaction can be received at the computing device 106. For instance, information identifying the application and the time and location at which the application was interacted with can be provided to the computing device 106. The interaction can include opening the application, viewing content displayed by the application, providing input to the application via a user interface (e.g., using touch input), or any other suitable user interaction with the application.

The mobile device 102 can be any suitable portable device such as a smartphone, tablet, media player, and the like. In some embodiments, the mobile device 102 can include the computing device 106. In some other embodiments, the computing device 106 can be a remote device (e.g., a remote server computer). When the computing device 106 is a remote device, information can be exchanged using any suitable communication network such as the Internet. In some embodiments, the computing device 106 and the mobile device 102 can communicate via a wireless voice and/or data network (e.g., using cellular telephone technology, advanced data network technology such as 3G, 4G or EDGE, WiFi (IEEE 802.11 family standards), or any other suitable mobile communication technology).

The application running on the mobile device 102 can be any suitable type of application. Exemplary types of applications may include, but are not limited to, message applications (e.g., e-mail, SMS, voice, etc.), web browsers, calendar applications, news applications, games applications, media playback and/or editing applications, social network applications, productivity application, sports applications, travel applications, weather applications, surf forecast applications, entertainment applications, photo editing applications, utility applications, map applications, word processors, text editors, search engine interfaces, source code editors, database query tools, command line interpreters, and the like.

When information about the user's interaction with the application is received, the computing device 106 can identify the type of the application. For instance, in some embodiments, the computing device 106 can parse a description of the application (e.g., using a natural language processing algorithm). The application description can be stored on the computing device 106. For instance, when an application is downloaded, a title and summary of the application may also be downloaded and stored on the computing device 106 along with the executable application. In some other embodiments, application descriptions can be stored remotely (e.g., on a remote server computer) accessible to the computing device 106.

The user may interact with the application at many different times and locations. In some embodiments, the application may regularly be used at a particular time and location. By tracking the times and locations corresponding to application usage, the computing device 106 can identify interaction patterns and can associate the type of the application with the time and location. As illustrated in FIG. 1, such associations can be stored on the computing device 106 in the form of an affinity model 108.

The generated affinity model 108 can be used to provide personalized content to the user going forward. For instance, when the computing device 106 determines at a later time that the mobile device 102 is at a location corresponding to the location stored in the affinity model 108 and that the current time corresponds to the time stored in the affinity model 108, content related to the type of the application 110 can be generated by the computing device 106 (or retrieved from internal or external storage). As further shown in FIG. 1, the content related to the type of the application 110 can be provided by the computing device 106 to the mobile device 102 which can then display (or otherwise present) the content 110 to the user.

II. Location-Based Personalized Content

Figure 2:
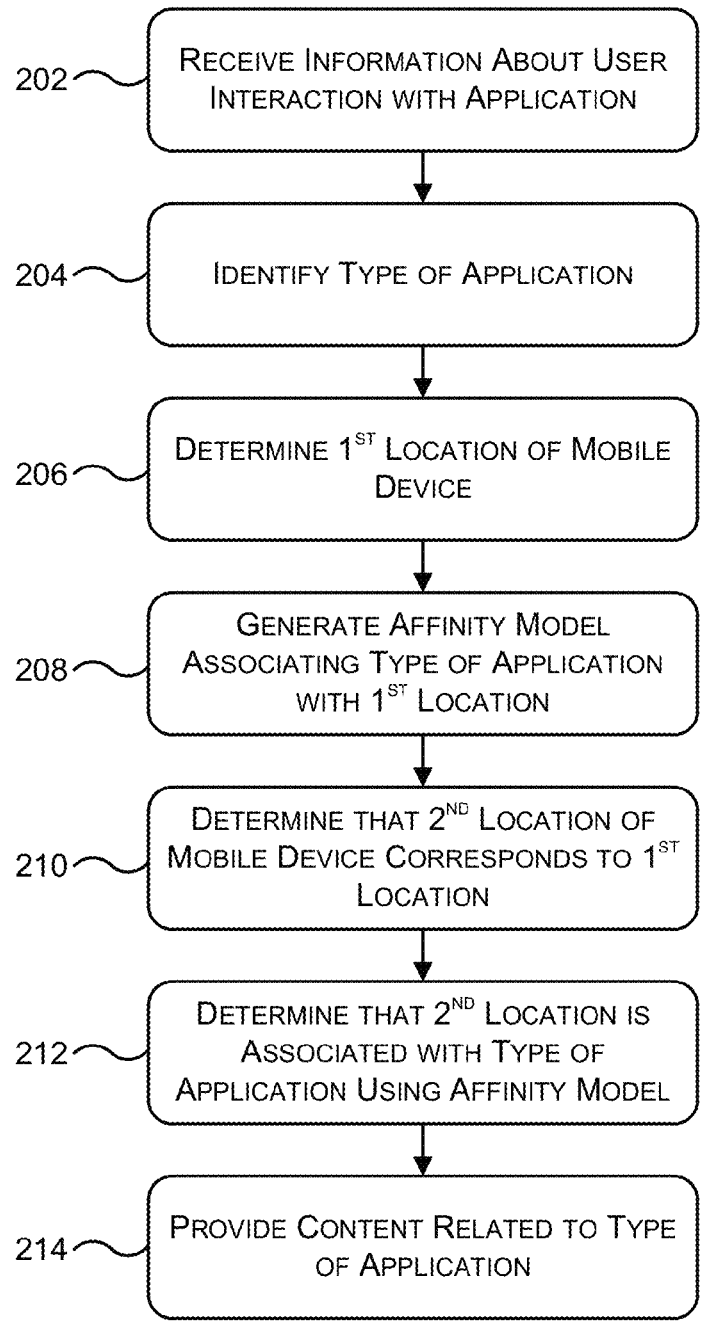
FIG. 2 is a flowchart illustrating a method 200 for providing content related to a type of application based on historical interactions with the application on a mobile device at a particular location according to an embodiment of the present invention.

FIG. 2 is a flowchart illustrating a method 200 for providing content related to a type of application based on historical interactions with the application on a mobile device at a particular location according to an embodiment of the present invention. Method 200 may be performed entirely or partially by a processor of a mobile device, a computing device included in a mobile device, a remote server computer, or any other suitable device. An application being executed by the processor may provide instructions for performing the method 200.

At block 202, the computing device receives information about a user interaction with an application running on the mobile device at a first time. The application can be any suitable application, and the information about the user interaction received by the computing device can include an identifier of the application. The interaction itself can be any suitable interaction. For instance, the interaction can include the user viewing content displayed by the application. In some embodiments, the mobile device can include the computing device. In some other embodiments, the computing device can be a remote server computer that communicates with the mobile device via any suitable communication network (e.g., the Internet, a voice and/or data network, etc.).

At block 204, the type of the application is identified by parsing a description of the application. In some embodiments, the description (e.g., a title and/or summary) of the application may be stored on the computing device or may be stored remotely (e.g., on a remote server computer). Using the identifier, the description of the application can be located and retrieved. In some embodiments, the description of the application can be parsed (and the application type identified) using a natural language processing algorithm as described in further detail below.

At block 206, a first location of the mobile device is determined, the mobile device being at the first location at the first time. The first location can be determined using any suitable technique, such as by utilizing a Global Positioning System (GPS), cellular tower triangulation data, cellular tower signal strength data, wireless access point data, an Internet Protocol (IP) address, or the like. In some embodiments, when the computing device is a remote server computer, the first location can be determined by the mobile device and then provided by the mobile device to the computing device.

The identified first location can include a geographic location (e.g., geographic coordinates, a street address, city, state, country, etc.). In some embodiments, one or more attributes of the first location can also be determined (e.g., coffee shop, work, home, beach, etc.). For instance, attributes of the first location can be determined based upon historical location data. If the mobile device is consistently at a particular geographic location at nighttime, it can be inferred that this is the location of the user's home. Similarly, if the mobile device is typically at a particular location from 9:00 am to 5:00 pm Monday through Friday, it can be inferred that this is the location of the user's work. In some embodiments, the computing device may store (or have access to) a database that maps geographic locations (e.g., street addresses) to specific merchants, landmarks, or other locations of interest. For instance, the computing device can perform a search (e.g., using a web-based search engine) to identify attributes of locations. In some other embodiments, attributes of the first location can be determined by natural language processing. For instance, if a purchase is made at a particular type of merchant, a receipt may be transmitted to the mobile device (e.g., as an SMS or e-mail message). Such a receipt can be parsed to determine the type of merchant located at the geographic location. Any suitable technique can be used to determine attributes of the first location.

In some embodiments, where the computing device is a remote server computer, the first location (e.g., the geographic location) of the mobile device can be determined by the mobile device and then transmitted to the computing device. In such embodiments, attributes of the first location can be determined by the mobile device and/or the computing device. Thus, the information about the user interaction with the mobile device received by the computing device at block 202 can include the geographic location of the mobile device and attributes of the first location.

At block 208, an affinity model is generated that associates the type of the application with the first location. As described in further detail below, the affinity model can reflect many user interactions with the application at the first location and/or at locations that share an attribute with the first location (e.g., coffee shops having different geographic locations). In some embodiments, the association between the first location and the type of the application can be established in the affinity model only after a threshold number of application interactions occur when the mobile device is at the first location and/or locations with a shared attribute. In some embodiments, associations are established in the affinity model after only one application interaction. A dynamic affinity value can be assigned to each application type and location pair, the affinity value representing the confidence that a relationship in fact exists between a given application type and location. In some embodiments, the affinity value may be proportional to the frequency that application interactions occur at a location such that a large number of user interactions with the application at the location (or locations with a shared attribute) over time result in a large affinity value being assigned to the application type/location pair.

At block 210, it is determined at a second time that a second location of the mobile device corresponds to the first location, the mobile device being at the second location at the second time. In some embodiments, determining that the second location corresponds to the first location includes determining that the second location and the first location are the same location, i.e. the same—or approximately the same—geographic location (e.g., the user's home). In some embodiments, determining that the second location corresponds to the first location includes determining that the second location and the first location share a common attribute (e.g., different beaches, coffee shops, movie theaters, etc.).

At block 212, it is determined using the affinity model that the second location is associated with the type of the application based on the correspondence of the second location to the first location. In some embodiments, this determination can include determining a confidence value that the second location is associated with the type of the application, comparing the confidence value against a threshold value, and determining that the confidence value exceeds the threshold value. For instance, the confidence value can take into account the affinity value described above which represents the confidence that a relationship exists between the first location and the application type. In some embodiments, the confidence value can also take into the account the relative confidence that the second location in fact corresponds to the first location. For instance, if the first and second locations are the same location (e.g., the same geographic location), this may indicate a high correspondence between the first and second locations. If the first and second locations are different geographic locations but share a common attribute (e.g., different movie theaters), this may indicate an intermediate or lower correspondence between the first and second locations. The determined confidence value that the second location corresponds to the application type can be compared against a threshold value that may be predetermined. In some embodiments, the threshold value may be adjusted or otherwise customized by the user.

At block 214, content related to the type of the application can be provided to the mobile device. In some embodiments, the content can then be automatically displayed or otherwise presented to the user by the mobile device. For instance, the content can be automatically displayed as an alert, banner, badge notification, or the like. In some embodiments, the content can be displayed as an entry in a pull-down menu accessible on the mobile device. The content related to the application type can also be audio and/or video content. Such content can be provided to the user via a speaker and/or display of the mobile device.

In some embodiments, the affinity model generated at block 208 can associate "concept tags" corresponding to the application type and first location using a probability model (e.g., a Bayesian model). For example, upon receiving the information about the user interaction with the application running on the mobile device at the first location, the mobile device can be provided with a concept tag corresponding to the type of the application and a concept tag corresponding to the first location of the mobile device. In such embodiments, generating the affinity model that associates the type of the application with the first location at block 208 can include associating the concept tag corresponding to the type of the application with the concept tag corresponding to the first location in the affinity model. At block 210, determining that the second location of the mobile device corresponds to the first location may include determining that the concept tag corresponding to the first location also corresponds to the second location. In some embodiments, a counter may be assigned to the association of the concept tag corresponding to the type of the application with the concept tag corresponding to the first location. The counter can be incremented in response to receiving the information about the user interaction with the application (i.e. received at block 202) of the identified type (i.e. identified at block 204) at the first location (i.e. determined at block 206). At block 214, the content related to the type of the application may be provided in response to determining that the concept tag corresponding to the first location also corresponds to the second location, and that the counter meets or exceeds a threshold value. Further details regarding the use of concept tags to generate affinity models and provide personalized content are described below FIG. 3 is a diagram 300 showing one illustration of a computing device 306 that can provide content related to a type of application based on historical interactions with the application on a mobile device 302 at a particular location according to an embodiment of the present invention.

Figure 3:
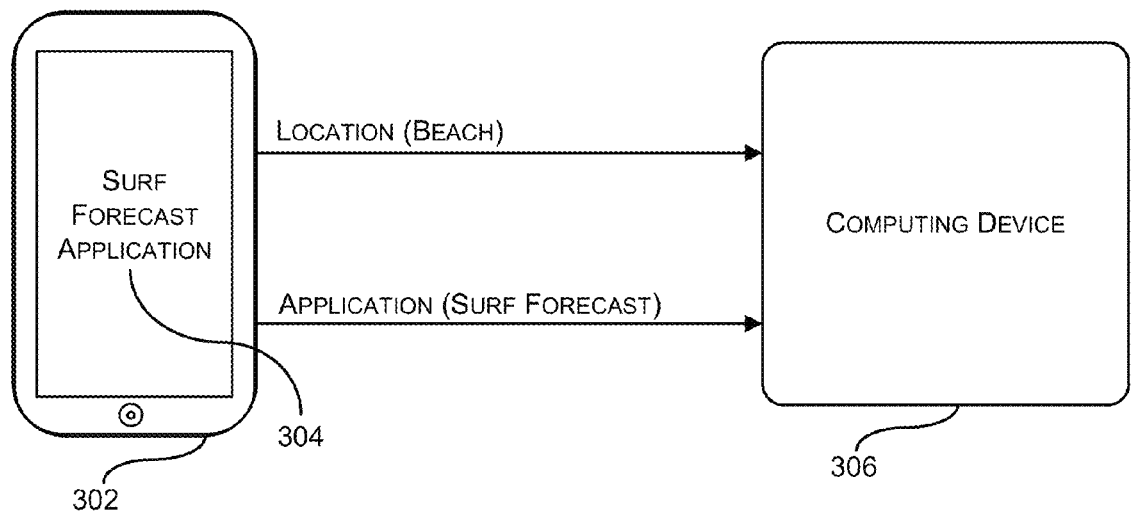
FIG. 3 is a diagram 300 showing one illustration of a computing device that can provide content related to a type of application based on historical interactions with the application on a mobile device at a particular location according to an embodiment of the present invention.
Figure 3:
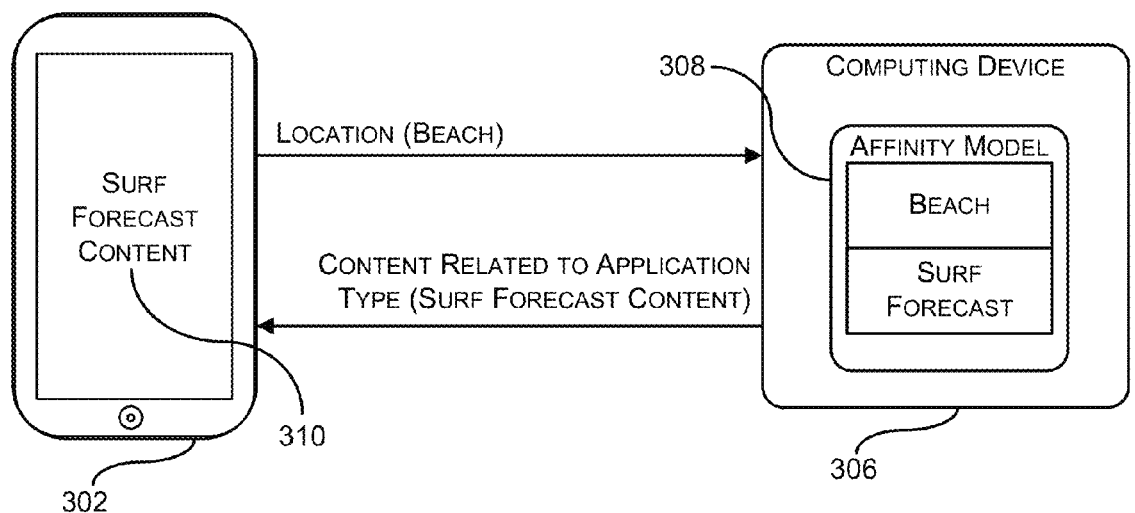

In the illustration shown in FIG. 3, the user is interacting with a "surf forecast" application 304 running on the mobile device 302 while the user is located at or near a beach. As shown in FIG. 3, information about the user's interaction with the surf forecast application (e.g., an identifier of the surf forecast application and an indication of the mobile device's location) are received at the computing device 306. The computing device 306 identifies the type of the application (e.g., surf forecast) by parsing a description of the application retrieved using the identifier of the application. The computing device 306 further determines that the user is at or near the beach based on the received indication of the location of the mobile device 302. For instance, the computing device 306 may receive geographic coordinates from the mobile device 302 and may map the coordinates to the beach.

The user in this illustration may be an avid surfer and may regularly check surf conditions using the surf forecast application 304 when travelling to (or arriving at) a beach. As the user interacts with the surf forecast application 304 over time, the computing device 306 develops an affinity model 308 that associates the type of the application (i.e. surf forecast) with the mobile device 302 being at or near a beach.

As further shown in FIG. 3, at some time after the affinity model 308 has been generated, the user may travel to a beach to surf. This can be a beach the user has surfed at before, or a beach the user has never been to. In either case, when the user arrives at (or is near) the beach, the mobile device 302 provides the location information (e.g., geographic coordinates or an indication that the location corresponds to a beach) to the computing device 306. Using the affinity model 308, the computing device 306 determines that the user's current location is associated with a surf forecast. In response, the computing device 306 then provides surf forecast content 310 (e.g., surf conditions) to the mobile device 302. The surf forecast content 310 is then displayed or otherwise provided to the user by the mobile device 302. Accordingly, the surf forecast content 310 can be automatically provided to the user by the mobile device 302 without the user having to initiate the surf forecast application 304.

III. Time-Based Personalized Content

Figure 4:
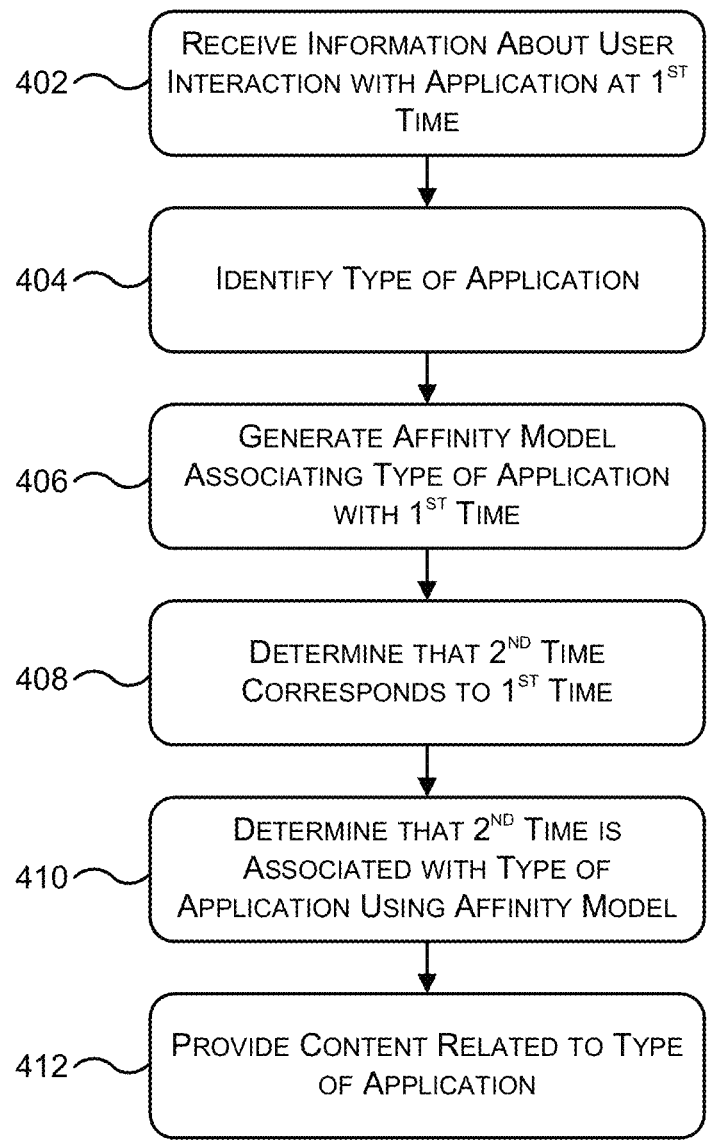
FIG. 4 is a flowchart illustrating a method 400 for providing content related to a type of application based on historical interactions with the application on a user device at a particular time according to embodiments of the present invention.

FIG. 4 is a flowchart illustrating a method 400 for providing content related to a type of application based on historical interactions with the application at a particular time according to embodiments of the present invention. A user device can be a portable device (e.g., a mobile device) or a non-portable device (e.g., a desktop computer). Method 400 may be performed entirely or partially by a processor in a user device, a computing device included in a user device, a remote server computer, or any other suitable device.

At block 402, the computing device receives information about a user interaction with an application running on the user device at a first time. As described above in regards to block 202 of the method 200, the application can be any suitable application and the interaction can be any suitable interaction with the application. The user device can be a portable device (e.g., a mobile device) or a non-portable device (e.g., a desktop computer). In some embodiments, the user device can include the computing device. In some other embodiments, the computing device can be a remote server computer that communicates with the user device via any suitable communication network (e.g., the Internet, a voice and/or data network, etc.).

The first time can be determined using any suitable technique. For instance, the information about the user interaction with the application received by the computing device at block 402 can include a time stamp. In some embodiments, the mobile device and/or computing device may include an internal clock (e.g., a digital clock) that is synchronized with an external source of time data (e.g., as provided by a cellular or other data network). The first time can represent any suitable temporal concept. For instance, the first time can include at least one of the time of day (e.g., 10:00 am, morning, sunset, etc.), day of the week (e.g., Monday, weekend, weekday, etc.), a month, a date (e.g., March $24^{th}$), a season (e.g., summer), a holiday (e.g., Thanksgiving), and the like.

At block 404, the type of the application is identified by parsing a description of the application. In some embodiments, the description (e.g., a title and/or summary) of the application may be stored on the computing device or may be stored remotely (e.g., on a remote server computer). Using the identifier, the description of the application can be located and retrieved. In some embodiments, the description of the application can be parsed (and the application type identified) using a natural language processing algorithm as described in further detail below.

At block 406, an affinity model is generated that associates the type of the application with the first time, the affinity model being stored on the computing device. As described in further detail below, the affinity model can reflect many user interactions with the application at the first time. In some embodiments, the association between the first time and the type of the application can be established in the affinity model only after a threshold number of application interactions occur at the first time. In some embodiments, associations are established in the affinity model after only one application interaction. A dynamic affinity value can be assigned to each application type and time pair, the affinity value representing the confidence that a relationship in fact exists between a given application type and time. In some embodiments, the affinity value may be proportional to the frequency that application interactions occur at a time such that a large number of user interactions with the application at the time result in a large affinity value being assigned to the application type/time pair.

At block 408, it is determined at a second time that the second time corresponds to the first time. The second time can be determined using an suitable technique such as that described above with respect to determining the first time. As with the first time, the second time can include at least one of a time of day, a day of the week, a month, a date, a season, and a holiday. In some embodiments, determining that the second time corresponds to the first time includes determining that the second time and the first time are the same time. In some other embodiments, determining that the second time corresponds to the first time includes determining that they are approximately the same. For instance, if the first time is 10:00 am, the second time can be determined to correspond to the first time if it is within some defined range (e.g., +/−5 minutes).

At block 410, it is determined using the affinity model that the second time is associated with the type of the application based on the correspondence of the second time to the first time. In some embodiments, this determination can include determining a confidence value that the second time is associated with the type of the application, comparing the confidence value against a threshold value, and determining that the confidence value exceeds the threshold value. For instance, the confidence value can take into account the affinity value described above which represents the confidence that a relationship exists between the first time and the application type. In some embodiments, the confidence value can also take into the account the relative confidence that the second time in fact corresponds to the first time. For instance, if the first and second times are the same time, this may indicate a high correspondence between the first and second times. If, however, the first and second times are some temporal interval apart, this may indicate an intermediate or lower correspondence between the first and second times. The determined confidence value that the second time corresponds to the application type can be compared against a threshold value that may be predetermined. In some embodiments, the threshold value may be adjusted or otherwise customized by the user.

At block 412, content related to the type of the application can be provided to the user device. In some embodiments, the content can then be automatically displayed or otherwise presented to the user by the user device. For instance, the content can be automatically displayed as an alert, banner, badge notification, or the like. In some embodiments, the content can be displayed as an entry in a pull-down menu accessible on the user device. The content related to the application type can also be audio and/or video content. Such content can be provided to the user via a speaker and/or display of the user device.

In some embodiments, the affinity model generated at block 406 can associate "concept tags" corresponding to the application type and first time using a probability model (e.g., a Bayesian model). For example, upon receiving the information about the user interaction with the application running on the user device at the first time, the user device can be provided with a concept tag corresponding to the type of the application and a concept tag corresponding to the first time. In such embodiments, generating the affinity model that associates the type of the application with the first time at block 406 can include associating the concept tag corresponding to the type of the application with the concept tag corresponding to the first time in the affinity model. At block 408, determining that the second time corresponds to the first time may include determining that the concept tag corresponding to the first time also corresponds to the second time. In some embodiments, a counter may be assigned to the association of the concept tag corresponding to the type of the application with the concept tag corresponding to the first time. The counter can be incremented in response to receiving the information about the user interaction with the application (i.e. received at block 402) of the identified type (i.e. identified at block 404) at the first time. At block 412, the content related to the type of the application may be provided in response to determining that the concept tag corresponding to the first time also corresponds to the second time, and that the counter meets or exceeds a threshold value. Further details regarding the use of concept tags to generate affinity models and provide personalized content are described below FIG. 5 is a diagram 500 showing one illustration of a computing device 506 that can provide content related to a type of application based on historical interactions with the application on a user device 502 at a particular time according to an embodiment of the present invention.

Figure 5:
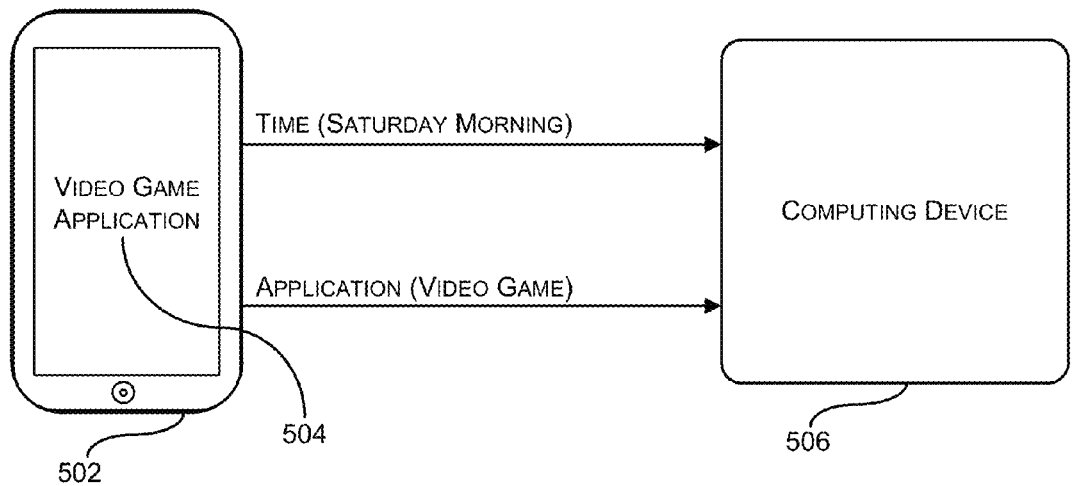
FIG. 5 is a diagram 500 showing one illustration of a computing device that can provide content related to a type of application based on historical interactions with the application on a user device at a particular time according to an embodiment of the present invention.
Figure 5:
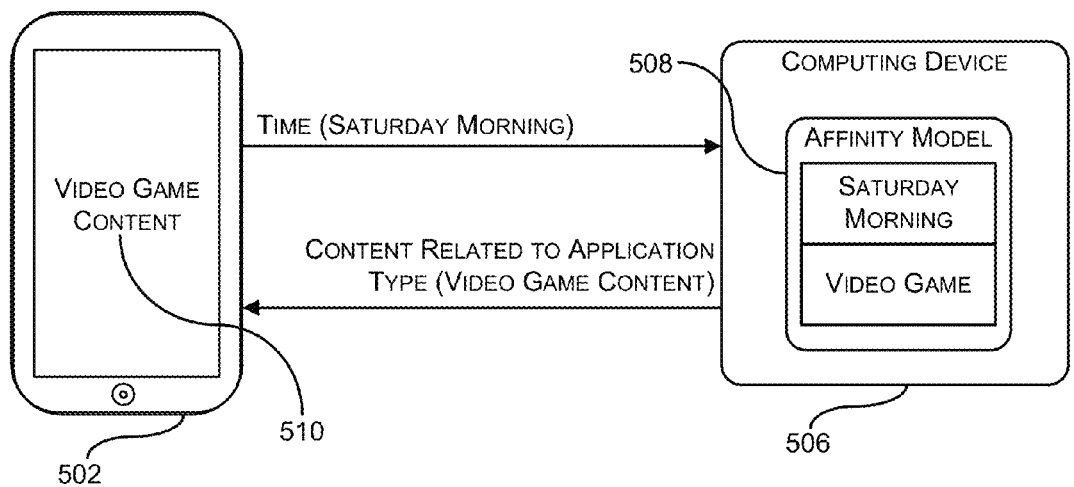

In the illustration shown in FIG. 5, the user is interacting with a "video game" application 504 running on the user device 502 on a Saturday morning. As shown in FIG. 5, information about the user's interaction with the video game application (e.g., an identifier of the video game application and an indication of the time) are received at the computing device 506. The computing device 506 identifies the type of the application (e.g., video game) by parsing a description of the application retrieved using the identifier of the application. The computing device 506 further determines that the user interacted with the video game application on a Saturday morning based on the time indication received from the user device 502. In some embodiments, the time indication received from the user device 502 may include the day (i.e. Saturday) and time of day (e.g., 10:00 am) which the computing device 506 can then convert into the temporal concept "Saturday morning."

The user in this illustration may regularly play video games using the video game application 504 on Saturday mornings. As the user interacts with the video game application 504 (and/or other video game applications) over time, the computing device 506 develops an affinity model 508 that associates the type of the application (i.e. video game) with Saturday mornings.

As further shown in FIG. 4, at some time after the affinity model 508 is generated, the computing device 506 determines that the current time (i.e. a Saturday morning) is associated with video games based on the association in the affinity model 508. In response, the computing device 506 then provides video game content (e.g., video game recommendations) 510 to the user device 502 which then displays or otherwise presents the content 510 to the user. For instance, when determining the application type to be a video game, the computing device 506 can also determine the genre of the video game (e.g., a "sports" video game). Upon determining that it is currently Saturday morning, the user can be presented with recommendations for other sports video games.

Accordingly, the user can be provided content tailored to their historical application usage patterns.

IV. Personalized Content Based on Both Location and Time

Figure 6:
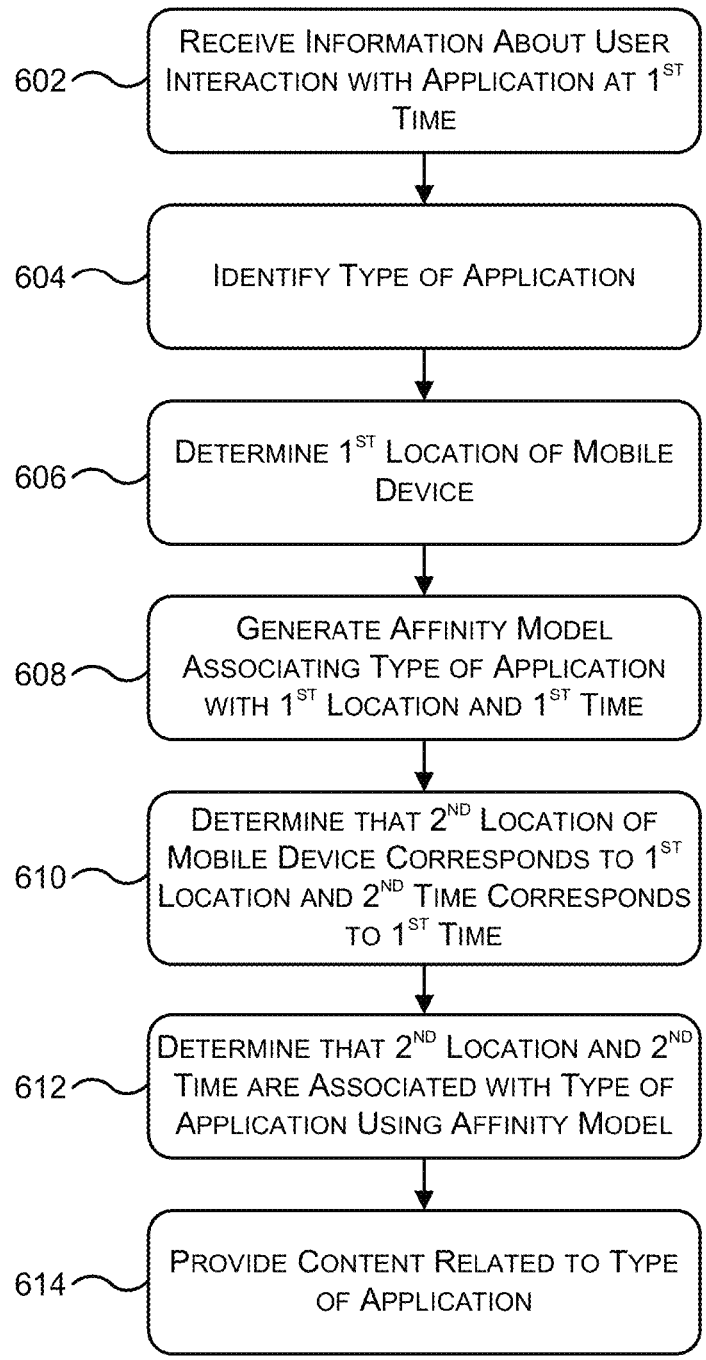
FIG. 6 is a flowchart illustrating a method 600 for providing content related to a type of application based on historical interactions with the application on a mobile device at a particular time and location according to embodiments of the present invention.

FIG. 6 is a flowchart illustrating a method 600 for providing content related to a type of application based on historical interactions with the application on a mobile device at a particular time and location according to embodiments of the present invention. Method 600 can be performed entirely or partially by a processor of a mobile device, a computing device included in a mobile device, a remote server computer, or any other suitable device. An application being executed by the processor may provide instructions for performing the method 600.

At block 602, the computing device receives information about a user interaction with an application running on the mobile device at a first time. As described above in regards to block 202 of the method 200 and block 402 of the method 400, the application can be any suitable application and the interaction can be any suitable interaction with the application. In some embodiments, the mobile device can include the computing device. In some other embodiments, the computing device can be a remote server computer that communicates with the mobile device via any suitable communication network (e.g., the Internet, a voice and/or data network, etc.).

At block 604, the type of the application is identified by parsing a description of the application. In some embodiments, the description (e.g., a title and/or summary) of the application may be stored on the computing device or may be stored remotely (e.g., on a remote server computer). Using the identifier, the description of the application can be located and retrieved. In some embodiments, the description of the application can be parsed (and the application type identified) using a natural language processing algorithm as described in further detail below.

At block 606, a first location of the mobile device is determined, the mobile device being at the location at the first time. As described above in regards to block 206 of the method 200, the first location of the mobile device and any attributes of the first location can be determined using any suitable technique. In some embodiments, when the computing device is a remote server computer, the geographic coordinates of the first location and/or attributes of the first location can be determined by the mobile device and then provided by the mobile device to the computing device. The first time can represent any suitable temporal concept and can be determined using any suitable technique as described above in regards to block 402 of the method 400.

At block 608, an affinity model is generated that associates the type of the application with the first location and the first time. As described in further detail below, the affinity model can reflect many user interactions with the application at the first time and at the first location (or locations that share an attribute with the first location). In some embodiments, the association between the first location, the first time, and the type of the application can be established in the affinity model only after a threshold number of application interactions occur at the first time and when the mobile device is at the first location (or locations with a shared attribute). In some embodiments, associations are established in the affinity model after only one application interaction. A dynamic affinity value can be assigned to each grouping of application type, location, and time, the affinity value representing the confidence that a relationship in fact exists between a given application type, location, and time. In some embodiments, the affinity value may be proportional to the frequency that application interactions occur at a location and time such that a large number of user interactions with the application at the location (or locations with a shared attribute) and at the time result in a large affinity value being assigned to the application type, location, and time grouping.

At block 610, it is determined at a second time that a second location of the mobile device corresponds to the first location and that the second time corresponds to the first time, the mobile device being at the second location at the second time. In some embodiments, determining that the second location corresponds to the first location includes determining that the second location and the first location are the same location, i.e. the same—or approximately the same—geographic location (e.g., the user's work). In some embodiments, determining that the second location corresponds to the first location includes determining that the second location and the first location share a common attribute (e.g., different restaurants, grocery stores, sports venues, etc.). The second time can be determined using any suitable technique such as that described above with respect to determining the first time. As with the first time, the second time can include at least one of a time of day, a day of the week, a month, a date, a season, and a holiday. In some embodiments, determining that the second time corresponds to the first time includes determining that the second time and the first time are the same time. In some other embodiments, determining that the second time corresponds to the first time includes determining that they are approximately the same. For instance, if the first time is 5:00 pm, the second time can be determined to correspond to the first time if it is within some defined range (e.g., +/−15 minutes).

At block 612, it is determined using the affinity model that the second location is associated with the type of the application based on the correspondence of the second location to the first location, and that the second time is associated with the type of the application based on the correspondence of the second time to the first time. In some embodiments, this determination can include determining a confidence value that the second location and second time are associated with the type of the application, comparing the confidence value against a threshold value, and determining that the confidence value exceeds the threshold value. For instance, the confidence value can take into account the affinity value described above which represents the confidence that a relationship exists between the first location, first time, and application type. In some embodiments, the confidence value can also take into the account the relative confidence that the second location in fact corresponds to the first location and the relative confidence that the second time in fact corresponds to the first time. For instance, if the first and second locations are the same location (e.g., the same geographic location), this may indicate a high correspondence between the first and second locations. If the first and second locations are different geographic locations but share a common attribute (e.g., different movie theaters), this may indicate an intermediate or lower correspondence between the first and second locations. Similarly, if the first and second times are the same time, this may indicate a high correspondence between the first and second times. If, however, the first and second times are some temporal interval apart, this may indicate an intermediate or lower correspondence between the first and second times. The determined confidence value that the second location and second time corresponds to the application type can be compared against a threshold value that may be predetermined. In some embodiments, the threshold value may be adjusted or otherwise customized by the user.

At block 614, content related to the type of the application can be provided to the mobile device. In some embodiments, the content can then be automatically displayed or otherwise presented to the user by the mobile device. For instance, the content can be automatically displayed as an alert, banner, badge notification, or the like. In some embodiments, the content can be displayed as an entry in a pull-down menu accessible on the mobile device. The content related to the application type can also be audio and/or video content. Such content can be provided to the user via a speaker and/or display of the mobile device.

In some embodiments, the affinity model generated at block 608 can associate "concept tags" corresponding to the application type, the first location, and the first time using a probability model (e.g., a Bayesian model). For example, upon receiving the information about the user interaction with the application running on the mobile device at the first location and first time, the mobile device can be provided with a concept tag corresponding to the type of the application, a concept tag corresponding to the first location of the mobile device, and a concept tag corresponding to the first time. In such embodiments, generating the affinity model that associates the type of the application with the first location and first time at block 608 can include associating the concept tag corresponding to the type of the application, the concept tag corresponding to the first location, and the concept tag corresponding to the first time with each other in the affinity model. At block 610, determining that the second location of the mobile device corresponds to the first location may include determining that the concept tag corresponding to the first location also corresponds to the second location, and determining that the second time corresponds to the first time may include determining that the concept tag corresponding to the first time also corresponds to the second time. In some embodiments, a counter may be assigned to the association of the concept tag corresponding to the type of the application, the concept tag corresponding to the first location, and the concept tag corresponding to the first time. The counter can be incremented in response to receiving the information about the user interaction with the application (i.e. received at block 602) of the identified type (i.e. identified at block 604) at the first location (i.e. determined at block 606) at the first time. At block 614, the content related to the type of the application may be provided in response to determining that the concept tag corresponding to the first location also corresponds to the second location, that the concept tag corresponding to the first time also corresponds to the second time, and that the counter meets or exceeds a threshold value. Further details regarding the use of concept tags to generate affinity models and provide personalized content are described below FIG. 7 is a diagram 700 showing one illustration of a computing device 706 that can provide content related to a type of application based on historical interactions with the application on a mobile device 702 at a particular time and location according to an embodiment of the present invention.

Figure 7:
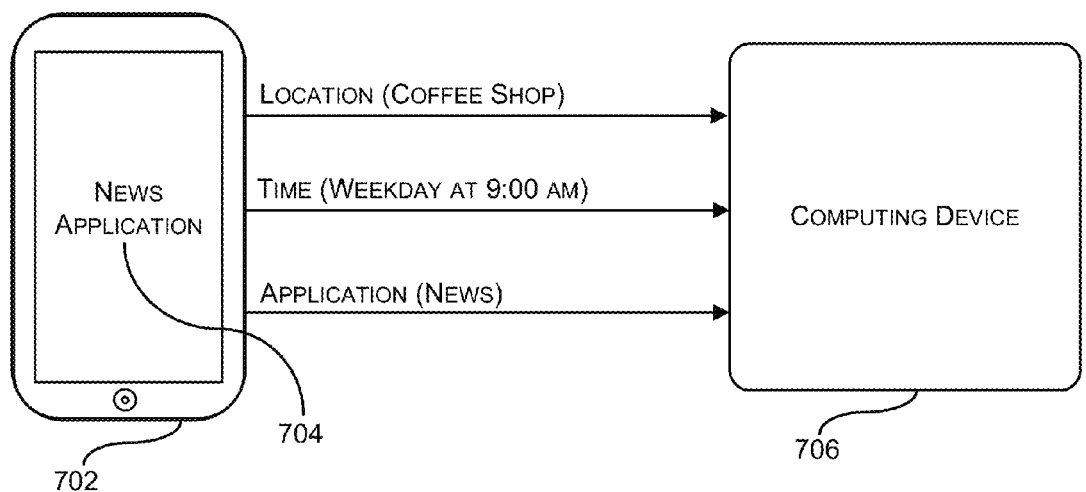
FIG. 7 is a diagram 700 showing one illustration of a computing device that can provide content related to a type of application based on historical interactions with the application on a mobile device at a particular time and location according to an embodiment of the present invention.
Figure 7:
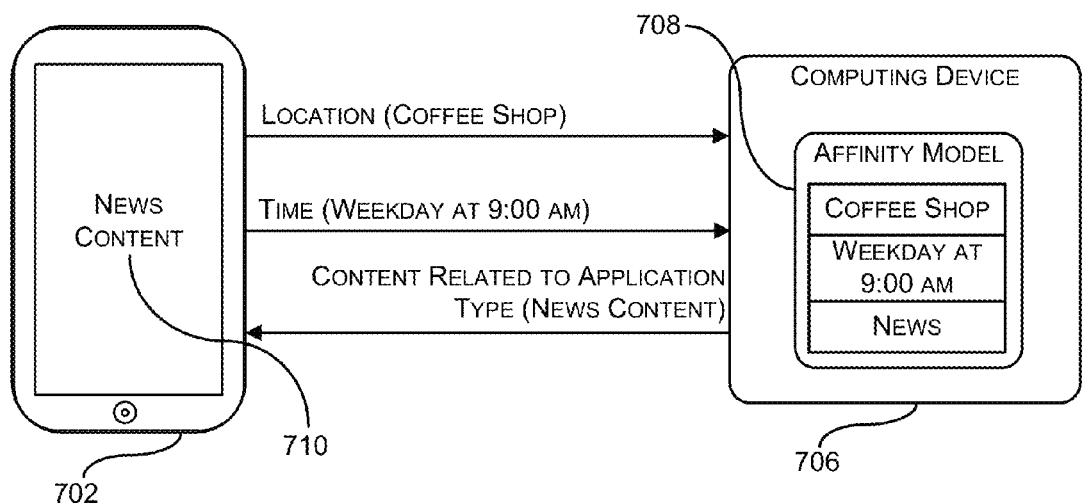

In the illustration shown in FIG. 7, the user is interacting with a "news" application 704 running on the mobile device 702 while the user is located in a coffee shop at 9:00 am on a weekday morning. As shown in FIG. 7, information about the user's interaction with the news application (e.g., an identifier of the news application, an indication of the location of the mobile device 702, and an indication of the current time) are received at the computing device 706. The computing device 706 identifies the type of the application (e.g., news) by parsing a description of the application retrieved using the identifier of the application. The computing device 706 further determines that the user is interacting with the news application in a coffee shop at 9:00 am on a weekday based on the indications of the location and time received from the mobile device 702. For instance, with respect to the location indication, the computing device 706 may receive geographic coordinates from the mobile device 702 and may map the coordinates to the coffee shop.

The user in this illustration may regularly read the news using the news application 704 in coffee shops on weekdays at around 9:00 am. As the user interacts with the news application 704 at the coffee shop (and/or other coffee shops) over time, the computing device 706 develops an affinity model 708 that associates the type of the application (i.e. news) with the mobile device 702 being at a coffee shop on weekdays around 9:00 am.

As further shown in FIG. 7, at some time after the affinity model 708 is generated, the user may visit a coffee shop on a weekday at around 9:00 am. The mobile device 702 provides the time information and location information (e.g., geographic coordinates or an indication that the location corresponds to a coffee shop) to the computing device 706. Using the affinity model 708, the computing device 706 determines that the user's current location is associated with the news. In response, the computing device 706 then provides news content 710 to the mobile device 702. Accordingly, the news content 710 can be automatically provided to the user by the mobile device 702 without the user having to initiate the news application 704.

V. Displaying Personalized Content

Figure 8A:
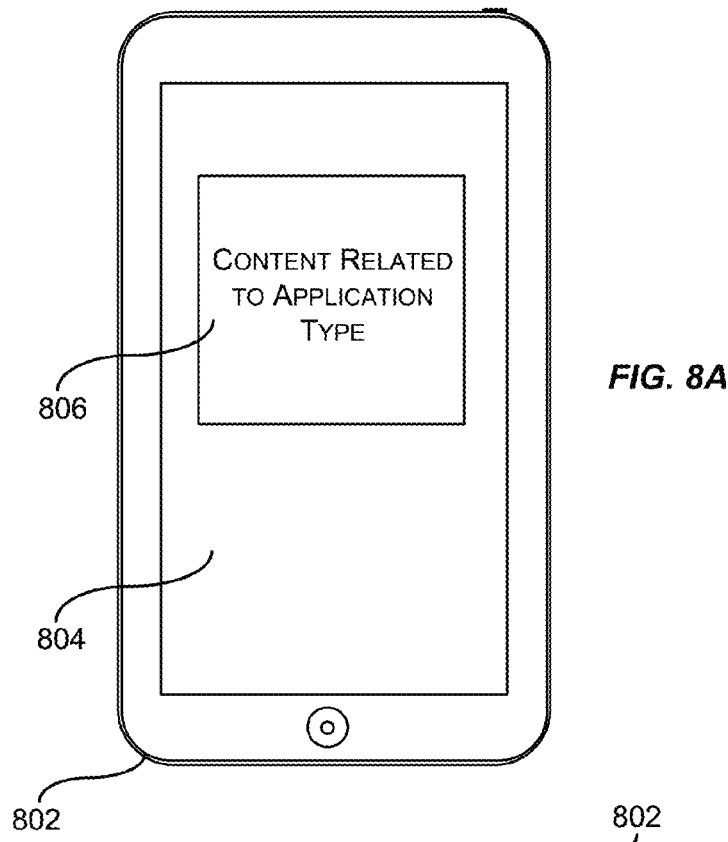
FIGS. 8A-8B illustrate exemplary user interfaces 804, 808 for providing content related to a type of an application according to embodiments of the present invention.
Figure 8B:
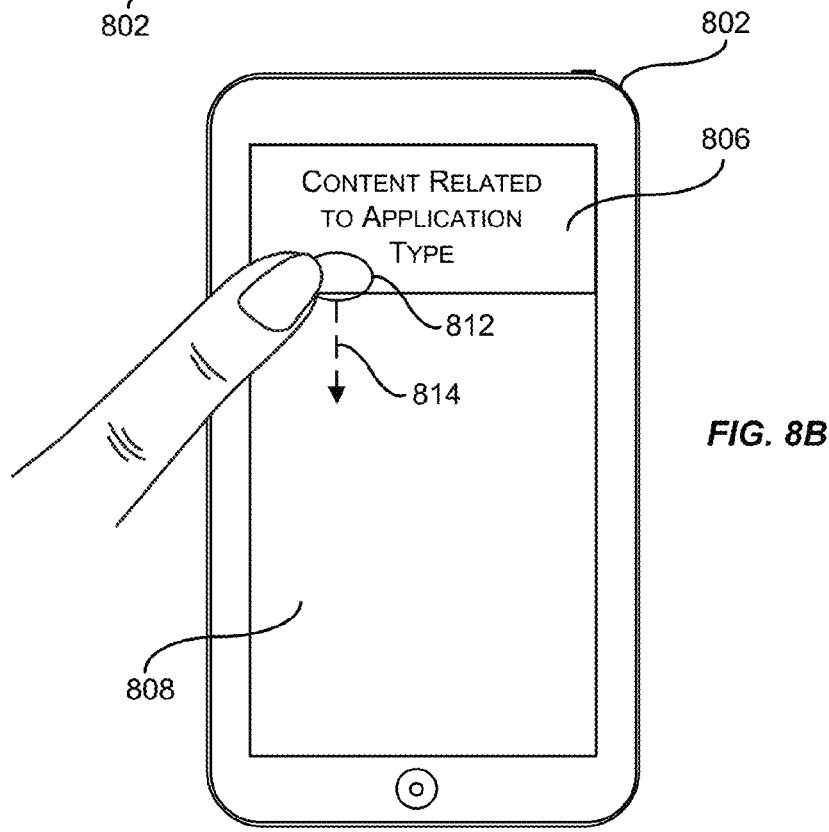

FIGS. 8A-8B illustrate exemplary user interfaces 804, 808 for providing content related to a type of an application according to embodiments of the present invention. As shown in FIG. 8A, a mobile device 802 can display a user interface 804 including content related to the type of an application 806. In the example shown in FIG. 8A, the content 806 is provided as a badge notification. In other embodiments, the content 806 can be provided as an alert, banner, or any other suitable visual depiction of the content 806.

In some embodiments, content related to the type of an application can be hidden from view until some input is received from the user. For instance, as shown in FIG. 8B, the mobile device 802 can display a user interface 808 including a pull-down menu including the content 806. In response to the user providing a "drag" gesture by placing a finger on a region 812 of the user interface 808 and moving their finger in the direction of arrow 814, the content related to the application type 810 can be displayed in the user interface 808.

As illustrated in FIGS. 8A-8B, content related to the type of an application can be presented on a display (e.g., a touch-sensitive display). In some embodiments, content can be audio and/or video content. Audio content can be presented using an audio output device such as a speaker (not shown) of the mobile device 802. When the content is video content including both audio and video components, the content can be provided using both the display and the speaker of the mobile device 802. In embodiments of the invention, content related to the type of an application can be any suitable content presented to the user using any suitable technique.

VI. Application Description Parsing

As described herein, an affinity model can be generated that associates a type of an application with a time and/or location at which the application is utilized. In some embodiments, the application type may not be readily apparent. For instance, applications installed (or otherwise accessible) to a mobile device do not generally include standardized indicators of the application type. In some embodiments, an application type can be determined by parsing a description (e.g., a title and/or summary) of the application. Such a description may be stored at the same location as the application (e.g., in a memory of the mobile device), or may be stored at a remote location (e.g., a remote server computer accessible via the Internet or other data network). In some embodiments, application descriptions can be received for applications as a metadata feed provided by a remote server computer associated with an online store or other entity from which applications can be downloaded or otherwise utilized.

In some embodiments, parsing a description of an application to determine the application type may involve utilizing a natural language processing algorithm. Any suitable natural language processing algorithm can be used. Exemplary natural language processing algorithms may include, but are not limited to, the Stanford CoreNLP natural language processing tool described at http://nlp.stanford.edu/software/corenlp.shtml, which is herein incorporated by reference in its entirety.

In some embodiments, prior to utilizing a natural language processing algorithm to parse an application description, the application may first be converted into a format suitable for processing. For example, when the Stanford CoreNLP natural language processing tool is utilized, a "raw" description of an application can be reformatted by removing "line feed" and "carriage return" characters, replacing U+2018/U+2019 single quotation marks with U+0027 apostrophes, replacing U+201C/U+201D right/left double quotation marks with U+0022 double quotation marks, replacing colons and "=" with periods, removing asterisks, and replacing non-printable characters such as U+0000-U+001F and U+007F-U+D7FF with periods.

After processing an application description using a natural language processing algorithm, a type of the application can be identified by analyzing the parsed output of the algorithm. For instance, for each sentence in the description, the output can be a tree of parsed words or "tokens." Each token can be associated with a part-of-speech tag, a lemma form, and a named-entity category label. Unique tokens in the output can be summed and normalized, and tokens such as non-trivial nouns and verbs can be analyzed to deduce a type of the application (e.g., news, sports, video games, etc.). Such natural language processing can also be used to identify any other suitable information described herein such as location attributes, temporal concepts, and the like.

VII. Affinity Model

In embodiments of the invention, affinity models can be generated that associate application types with the particular locations and times at which such applications are interacted with by the user. Affinity models can be dynamic such that the relative strength of the associations changes over time in accordance with a user's application usage patterns. In some embodiments, each time an application is interacted with on a mobile device, the location (e.g., geographic coordinates), attributes of the location (e.g., coffee shop, restaurant, etc.), and time (e.g., time of day, day of the week, etc.) can be logged. Over time, many user interactions with the application can occur at many different locations, locations with different attributes, and different times. This information can be analyzed to identify usage patterns indicating relationships between the application and particular times and locations.

Dynamic affinity values can be assigned to groupings of application types, locations, and times, the affinity values representing the confidence that a relationship in fact exists between a given application type, location, and time grouping. For instance, referring to the illustration described above in the context of FIG. 7, a user may interact with a news application on their mobile device when in a coffee shop at around 9:00 am on a weekday morning. In the affinity model, the application type (i.e. news) can be associated with the location (i.e. coffee shop) and the time (9:00 am on a weekday morning). This grouping of application type, location, and time can be assigned an affinity value. Since the user in this illustration regularly uses the news application at coffee shops around 9:00 am on weekday mornings, the assigned affinity value can increase over time thereby representing a strong association between the application type, location, and time. The high affinity value may result in a high level of confidence that the user prefers to receive content related to the application type (i.e. news content) when located at a coffee shop at around 9:00 am on a weekday morning. Thus, when the user's mobile device is located at or near a coffee shop around 9:00 am on weekday mornings, new content can be automatically presented to the user with a reasonable certainty that the content will be relevant and desirable to the user.

In another illustration, the user may interact with the news application in another setting, such as when waiting in line at the grocery store on a Sunday afternoon. Upon detecting such an interaction, the affinity model can associate the application type (i.e. news) with the location (i.e. grocery store) and the time (i.e. Sunday afternoon). However, if the user only occasionally uses the news application when at the grocery store on a Sunday afternoon (e.g., if there is usually no line at the grocery store on Sunday afternoons, if the user generally does grocery shopping on Saturdays, etc.), the affinity value assigned to this grouping of application type, location, and time can be relatively low. Due to the low level of confidence that the user prefers to receive news content when at a grocery store on Sunday afternoons, news content may not be desirable to the user in such instances and thus may not be provided.

In some embodiments, an assigned affinity value can decrease over time as the user's habits change. For instance, if the user elects to work at the coffee shop on weekday mornings at 9:00 am instead of reading the news, starts going to the coffee shop at a later or earlier time, stops going to the coffee shop altogether on weekday mornings, etc., the affinity value assigned to the grouping of "news," "coffee shop," and "weekday at 9:00 am" can decrease which may result in the user not being provided with news content when the time and location criteria are satisfied. Thus, the affinity value can change over time in accordance with changes in application usage so that content provided to the user is relevant and provided at locations and times desirable to the user.

In some embodiments, in an affinity model, an application type, location (or location attribute), and/or time can be represented by "concept tags" associated with each other using a probability model (e.g., a Bayesian model or network). When an application is launched or otherwise utilized on a mobile device, this can be a triggering event that causes concept tags associated with the application type, current location, and/or current time to be identified. Counters can be associated with combinations of application type concepts, location concepts, and/or time concepts, and these counters can be incremented for such combinations of concept tags associated with the type of application being launched or otherwise utilized. In some embodiments, concept tags representing application types for some or all applications installed on the mobile device can be predetermined, and can be stored on the mobile device or remotely (e.g., on a remote server computer). Similarly, concept tags associated with possible locations and possible times can also be predetermined and stored on the mobile device or remotely. When concept tags are predetermined, the triggering event (i.e. the application utilization) can cause the mobile device to retrieve all concept tags relevant to the application type, location, and/or time. In some other embodiments, if concept tags are not predetermined, relevant concept tags can be generated in real time when utilization of the application is detected.

The concept tags associated with the application type, location, and/or time can be analyzed, and counters (e.g., histograms) can be assigned to various combinations of concept tags. If a counter was previously assigned to a particular combination of analyzed concept tags, the counter can be incremented (e.g., by 1). If a combination of analyzed concept tags is not currently assigned a counter, a new counter can be created and incremented (e.g., to equal 1). Such counters can be stored on the mobile device or, in some embodiments, remotely (e.g., on a remote server computer).

As the application (and other applications) is launched or otherwise utilized on the mobile device over time, counters assigned to combinations of concept tags can be further incremented. Each counter can be associated with a threshold value such that when the threshold value is met (or exceeded), this can confirm a relationship between concept tags corresponding to an application type, location, and/or time. In some embodiments, the value (i.e. number of counts) of a counter assigned to a particular combination of concept tags can be normalized, and one or more probabilities can be generated to further confirm whether a relationship between the concept tags in fact exists. For example, a counter value can be compared to the total number of times an associated application of the given type was utilized. Once a relationship between concept tags associated with an application type, location, and/or time is confirmed, content related to the application type can be provided (as described above). For example, after confirming the relationship between concept tags associated with an application type, location, and time, content related to the application type can be provided when the mobile device (or a remote device) determines that the mobile device is at the location and the associated time. Mobile device locations and/or times (and their corresponding concept tags) can be checked periodically (e.g., every 10 minutes, 5 minutes, 1 minute, 5 seconds, 1 second, etc.). If concept tag(s) corresponding to a detected current location and/or time are associated with a concept tag corresponding to a type of an application in an affinity model, content related to the type of the application can be provided if a relationship between the concept tags has been previously established (e.g., if an assigned counter meets/exceeds a threshold in the affinity model).

In some embodiments, counters assigned to combinations of concept tags can be reset (e.g., to zero) on a periodic basis (e.g., every day, week, month, etc.). Similarly, counters including low values can be periodically removed since a low counter value may suggest a low likelihood of a relationship between the associated concept tags. Similarly, if utilization of an application changes over time, a previously confirmed relationship between associated concept tags can be removed. For example, if a relationship was previously confirmed between concept tags associated with an application type, location and time, but a counter assigned to the combination of concept tags subsequently has a value less than the threshold for some interval of time, the previously identified relationship between concept tags can be removed. Thus, in such instances, content related to the application type may not be provided when the mobile device is determined to be at the particular location at the associated time.

Figure 9:
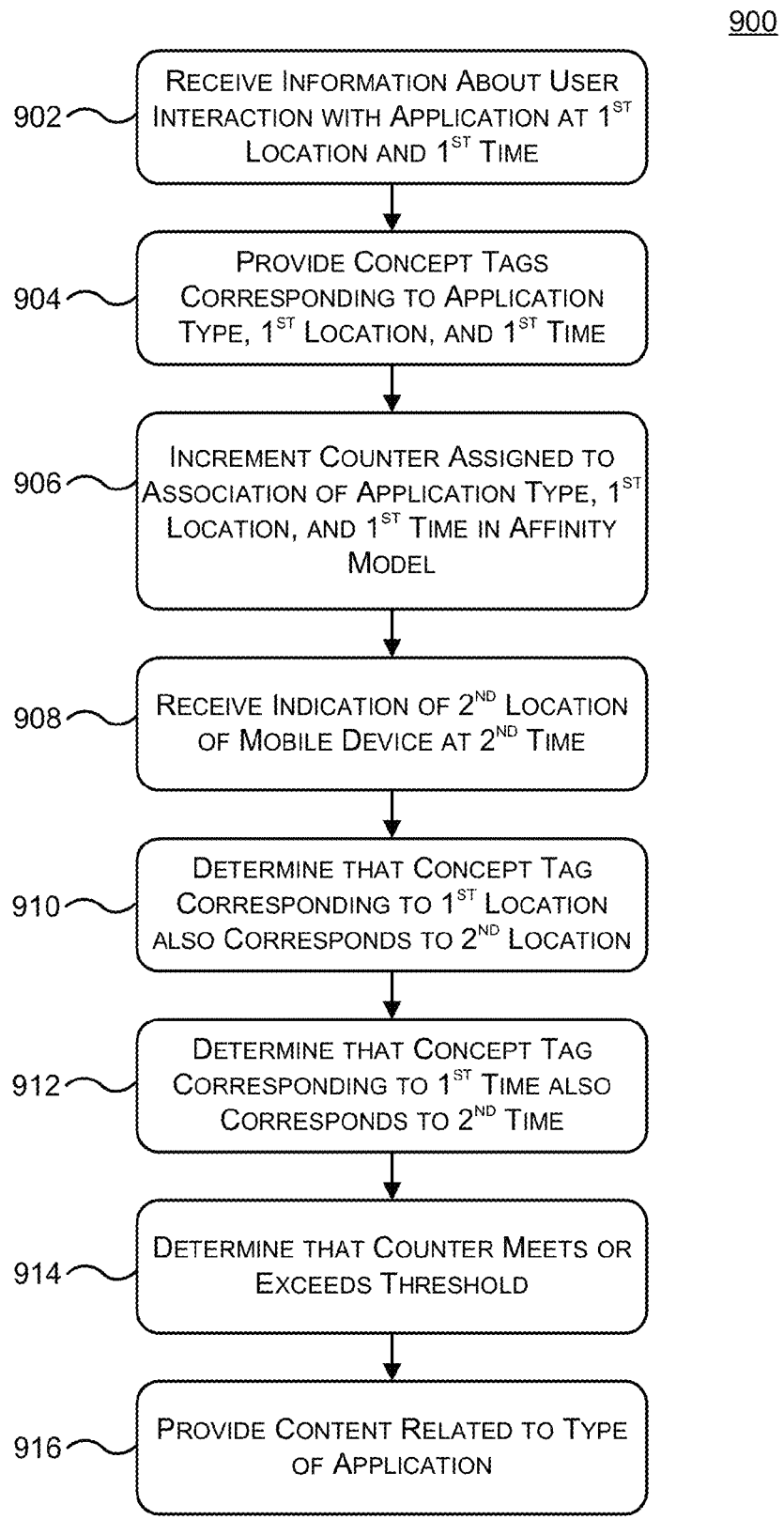
FIG. 9 is a flowchart illustrating a method 900 for providing content related to a type of application based on historical interactions with the application on a mobile device at a particular time and location using an affinity model with associated concept tags according to embodiments of the present invention.

FIG. 9 is a flowchart illustrating a method 900 for providing content related to a type of application based on historical interactions with the application on a mobile device at a particular time and location using an affinity model with associated concept tags according to embodiments of the present invention. Although the method 900 includes associating a concept tag corresponding to an application type with concept tags corresponding to both location and time, in some embodiments, a concept tag corresponding to an application type can be associated with just a concept tag corresponding to a location or just a concept tag corresponding to a time. Method 900 can be performed entirely or partially by a processor of a mobile device, a computing device included in a mobile device, a remote server computer, or any other suitable device. An application being executed by a processor may provide instructions for performing the method 900.

At block 902, the computing device receives information about a user interaction with an application running on the mobile device at a first location and first time. As described above in regards to block 202 of the method 200, block 402 of the method 400, and block 602 of the method 600, the application can be any suitable application and the interaction can be any suitable interaction with the application. For example, the interaction can be launching or otherwise utilizing the application running on the mobile device. In some embodiments, the mobile device can include the computing device. In some other embodiments, the computing device can be a remote server computer that communicates with the mobile device via any suitable communication network (e.g., the Internet, a voice and/or data network, etc.).

In an illustration similar to that described above in regards to the method 700 illustrated in FIG. 7, at block 902, the computing device can receive an indication that the user has loaded a "news" application on the mobile device while located in a coffee shop at 9:00 am on a Monday morning in January. For example, an identifier of the news application, an indication of the current location of the mobile device (e.g., geographic coordinates corresponding to the coffee shop), and an indication of the current time (e.g., 9:00 am, Monday, January, etc.) can be received by the computing device.

At block 904, the mobile device is provided concept tags corresponding to the type of the application, the first location, and the first time. In some embodiments, concept tags corresponding to application types may be previously generated for some or all applications installed on (or otherwise accessible to) the mobile device. As described above, an application type can be identified by parsing a description of the application (e.g., using natural language processing), and concept tags corresponding to the application type can be extracted from the parsed description terms. Concept tags for times and locations may also be previously generated (and my also involve natural language processing). In some other embodiments, some or all of the concept tags provided to the mobile device can be generated in real time in response to receiving the information about the user interaction with the application.

Referring back to the above illustration, at block 904, upon receiving an indication that the user launched a news application on the mobile device in a coffee shop at 9:00 am on a weekday morning in January, the mobile device can be provided with one or more concept tags corresponding to the application type (e.g., news), one or more concept tags corresponding to the location (e.g., coffee shop, street address, city, state, country, etc.), and one or more concept tags associated with the time (e.g., 9:00 am, morning, weekday, January, Winter, etc.).

At block 906, a counter can be incremented, the counter being assigned to an association of the concept tag corresponding to the application type, the concept tag corresponding to the first location, and the concept tag corresponding to the first time in an affinity model. For example, upon receiving the concept tags from the computing device, the mobile device may determine that an association exists in an affinity model between the concept tags corresponding to the application type, first location, and first time. A counter assigned to the associated concept tags can then be incremented (e.g., by 1) by the mobile device (or computing device). If no such counter exists, the mobile device can assign a new counter to the association of concept tags and increment it to an initial value (e.g., 1).

Referring back to the above illustration, at block 906, upon analyzing the concept tags received from the computing device, the mobile device may determine that an existing affinity model associates concept tags corresponding to the application type (e.g., "news"), location (e.g., coffee shop), and time (e.g., "morning" and "weekday"). The mobile device (or computing device) can then increment a counter assigned to this association of concept tags by 1.

At block 908, an indication of a second location of the mobile device at a second time is received. For example, at a later time, the computing device can receive an indication of the new second location (e.g., geographic coordinates) of the mobile device, and an indication of the new second time. In the above illustration, at block 908, the computing device may receive geographic coordinates corresponding to a location at or near a different coffee shop at 9:30 am on a Tuesday in July. The computing device may then determine concept tags relevant to the received information including concept tags corresponding to the second location (e.g., coffee shop, street address, city, state, country, etc.), and concept tags corresponding to the second time (e.g., 9:30 am, morning, weekday, July, Summer, etc.).

At block 910, it is determined that the concept tag corresponding to the first location also corresponds to the second location and, at block 912, it is determined that the concept tag corresponding to the first time also corresponds to the second time. In the above illustration, at block 910, the computing device may determine that the concept tag "coffee shop" corresponding to the location of the mobile device received at block 902 also corresponds to the new location of the mobile device received at block 908. Similarly, at block 912, the computing device may determine that the concept tags "morning" and "weekday" corresponding to the time at which the mobile device was at the location received at block 902 also corresponds to the new current time received at block 908.

At block 914, it is determined that the counter assigned to the association of the concept tag corresponding to the application type, the concept tag corresponding to the first location, and the concept tag corresponding to the first time, meets or exceeds a threshold value. As described above, when a threshold value assigned to a combination of concept tags has been met or exceeded, this may confirm that a relationship exists between such concept tags. In some embodiments, normalization and/or probability calculations may also be performed to further confirm whether a relationship in fact exists between concept tags.

Referring back to the above illustration, at block 914, the computing device may determine that the counter assigned to the association of the concept tags "news," "coffee shop," "morning," and "weekday" has met or exceeded a threshold value. For instance, the threshold value can be "10," and the current counter value can be "11" (i.e. based on the user interacting with a news application at a coffee shop on weekday mornings 11 times over a predetermined interval of time).

At block 916, content related to the type of the application can be provided to the mobile device in response to determining that the concept tag corresponding to the first location also corresponds to the second location (i.e. at block 910), that the concept tag corresponding to the first time also corresponds to the second time (i.e. at block 912), and that the counter meets or exceeds the threshold value (i.e. at block 914). In some embodiments, the content can then be automatically displayed or otherwise presented to the user by the mobile device. For instance, the content can be automatically displayed as an alert, banner, badge notification, or the like (e.g., as illustrated in FIG. 8A). In some embodiments, the content can be displayed as an entry in a pull-down menu accessible on the mobile device (e.g., as illustrated in FIG. 8B). The content related to the application type can also be audio and/or video content. Such content can be provided to the user via a speaker and/or display of the mobile device.

In the above illustration, at block 916, the computing device may automatically provide news content to the mobile device in response to determining that the new current location of the mobile device corresponds to the concept tag "coffee shop," that the new current time corresponds with the concept tags "morning" and "weekday," and that the counter has met or exceeded the threshold value of "10" associated with the counter assigned in the affinity model to the association of the concept tags "news," "coffee shop," "morning," and "weekday." Accordingly, the news content can be automatically provided to the user by the mobile device without the user having to launch the news application.

VIII. Mobile Device

Figure 10:
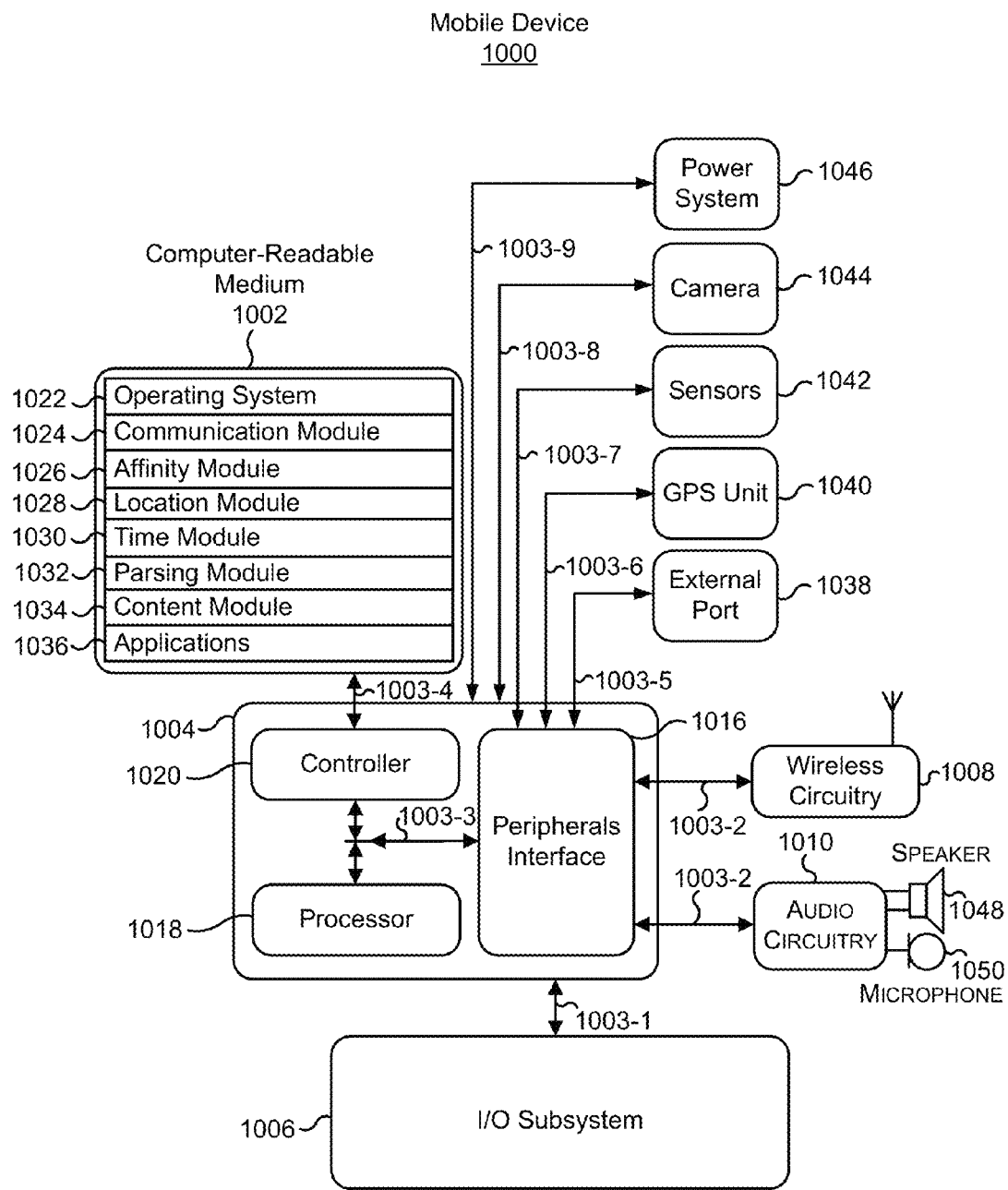
FIG. 10 is a block diagram of a mobile device 1000 according to embodiments of the invention.

FIG. 10 is a block diagram of a mobile device 1000 according to embodiments of the invention. The mobile device 1000 may include a computer-readable medium 1002, a processing system 1004, an input/output (I/O) subsystem 1006, wireless circuitry 1008, and audio circuitry 1010 including a speaker 1048 and a microphone 1050. These components may be coupled by one or more communication buses or signal lines 1003. The mobile device 1000 can be any suitable portable user device, including, but not limited to, a handheld computer, a tablet computer, a mobile phone (e.g., a smartphone), a laptop computer, a tablet device, a media player, a personal digital assistant (PDA), a key fob, a car key, an access card, a multi-function device, a portable gaming device, or the like, including a combination of two or more of these devices. Some or all of the components shown in FIG. 10 can alternatively be included in a non-portable user device such as a desktop computer.

It should be apparent that the architecture shown in FIG. 10 is only one example of an architecture for the mobile device 1000, and that the mobile device 1000 can have more or fewer components than shown, or a different configuration of components. For instance, in some embodiments, certain components shown in FIG. 10 can alternatively be included in a computing device separate from the mobile device 1000, such as a remote server computer. As an illustration, a computing device can include components such as the computer-readable medium 1002 and processing system 1004 with some or all of the other components shown in FIG. 10 being present in the mobile device 1000. In such embodiments, the computing device and the mobile device 1000 can communicate using any suitable communicate network and protocol as described herein. The various components shown in FIG. 10 can be implemented in hardware, software, or a combination of both hardware and software, including one or more signal processing and/or application specific integrated circuits.

The wireless circuitry 1008 can be used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, the wireless circuitry 1008 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this application. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

The wireless circuitry 1008 can be coupled to the processing system 1004 via a peripherals interface 1016. The peripherals interface 1016 can include conventional components for establishing and maintaining communication between peripherals and the processing system 1004. Voice and data information received by the wireless circuitry 1008 (e.g., in speech recognition or voice command applications) can be sent to one or more processors 1018 via the peripherals interface 1016. The one or more processors 1018 can be configurable to process various data formats for one or more application programs 1036 stored on the computer-readable medium 1002.

The peripherals interface 1016 can couple the input and output peripherals of the mobile device 1000 to the one or more processors 1018 and computer-readable medium 1002. The one or more processors 1018 can communicate with the computer-readable medium 1002 via a controller 1020. The computer-readable medium 1002 can be any device or medium that can store code and/or data for use by the one or more processors 1018. The computer-readable medium 1002 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, the peripherals interface 1016, one or more processors 1018, and memory controller 1020 can be implemented on a single chip, such as the processing system 1004. In some other embodiments, they can be implemented on separate chips.

The mobile device 1000 can also include a power system 1046 for powering the various hardware components. The power system 1046 can include a power management system, one or more power sources (e.g., battery, alternating current (AC)), a recharging system, a power failure detection circuit, a power converter or inverter, a power status indicator (e.g., a light emitting diode (LED)), and any other components typically associated with the generation, management and distribution of power in computing devices.

In some embodiments, the mobile device 1000 can include a camera 1044. In some embodiments, the mobile device 1000 can include sensors 1042. The sensors 1042 can include accelerometers, a compass, a gyrometer, pressure sensors, audio sensors, light sensors, barometers, and the like.

In some embodiments, the mobile device 1000 can include a GPS receiver, sometimes referred to as a GPS unit 1040. A computing device can use a satellite navigation system, such as the Global Positioning System (GPS), to obtain position information, timing information, altitude, or other navigation information. During operation, the GPS unit 1040 can receive signals from GPS satellites orbiting the Earth. The GPS unit 1040 can analyze the signals to make a transit time and distance estimation. The GPS unit 1040 can determine the current position (current location) of the computing device. Based on these estimations, the mobile device 1000 can determine a location fix, altitude, and/or current speed. A location fix can be geographical coordinates such as latitudinal and longitudinal information.

The one or more processors 1018 can run various software components stored in the computer-readable medium 1002 to perform various functions for the mobile device 1000. In some embodiments, the software components can include an operating system 1022, a communication module 1024, an affinity module 1026, a location module 1028, a time module 1030, a parsing module 1032, a content module 1034, and other applications 1036 (e.g., a news application, video game application, surf forecast application, etc.). Any of the software components shown in FIG. 10 can be in the form of a set of instructions.

The operating system 1022 can be any suitable operating system, including iOS, Mac OS, Darwin, RTXC, LINUX, UNIX, OS X, WINDOWS, or an embedded operating system such as VxWorks. The operating system 1022 can include various procedures, sets of instructions, software components and/or drivers for controlling and managing general system tasks (e.g., memory management, storage device control, power management, etc.) and can facilitate communication between various hardware and software components.

The communication module 1024 can facilitate communication with other devices over the one or more external ports 1038 or via the wireless circuitry 1008 and may include various software components for handling data received from the wireless circuitry 1008 and/or the onr or more external ports 1038. The one or more external ports 1038 (e.g., USB, FireWire, Lightning connector, 30-pin connector, etc.) can be adapted for coupling directly to other devices or indirectly over a network (e.g., the Internet, wireless LAN, etc.).

The affinity module 1026 can generate and maintain dynamic affinity models that associate the type of an application with the locations and/or times at which the application is interacted with. In some embodiments, application types can be received from the parsing module 1032, times can be received from the time module 1030, and locations can be received from the location module 1028 and/or the GPS unit 1040. The affinity module 1026 can also assign affinity values representing the relative affinity between an application type and a time and/or location.

Location module 1028 can assist in determining the current location (e.g., geographic coordinates or other geographic location identifier) of the mobile device 1000. Modern positioning systems include satellite based positioning systems, such as Global Positioning System (GPS), cellular network positioning based on "cell IDs," and WiFi positioning technology based on a WiFi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, the location module 1028 receives data from the GPS unit 1040 and analyzes the signals to determine the current geographic location of the mobile device. In some embodiments, the location module 1028 can determine a current location using WiFi or cellular location technology. For instance, the location of the mobile device 1000 can be estimated using knowledge of nearby cellular sites and/or WiFi access points with knowledge also of their locations. Information identifying the WiFi or cellular transmitter can be received at the wireless circuitry 1008 and passed to the location module 1028. In some embodiments, the location module 1028 receives the one or more transmitter IDs. In some embodiments, a sequence of transmitter IDs can be compared with a reference database (e.g., Cell ID database, WiFi reference database) that maps or correlates the transmitter IDs to position coordinates of corresponding transmitters, and computes estimated position coordinates for the mobile device 1000 based at least in part on the position coordinates of the corresponding transmitters. Regardless of the specific location technology used, the location module 1028 can receive information from which a location fix can be derived, interprets that information, and can determine location information, such as geographic coordinates, latitude/longitude, or other location fix data. Such location information can be passed to the affinity module 1026.

In some embodiments, the location module 1028 can also determine attributes of locations. For instance, upon determining a geographic location, the location module can cross-reference the geographic coordinates with a database of merchants, landmarks, and other places. Such a database can be stored in the computer-readable medium 1002 or can be retrieved from an external storage location (e.g., a remote server computer). In some embodiments, the location module 1028 can utilize the wireless circuitry 1008 and perform a search (e.g., via the Internet) to determines attributes of determined geographic locations (e.g., coffee shops, movie theaters, beaches, golf courses, etc.). These attributes can be provided to the affinity module 1026.

Time module 1030 can assist with determining the current time. In some embodiments, the time module 1030 can maintain an internal clock that can be synchronized with an external clock. For instance, the time module 1030 can utilize the wireless circuitry 1008 to retrieve time data provided by the Internet, a cellular network, or other suitable data network. Time module 1030 can identify temporal aspects such as the time of day (e.g., 10:00 am, morning, sunset, etc.), day of the week (e.g., Monday, weekend, weekday, etc.), a month, a date (e.g., March $24^{th}$), a season (e.g., summer), a holiday (e.g., Thanksgiving), and the like. Such time information can be provided to the affinity module 1026.

The parsing module 1032 can parse a description of an application to determine a type of the application. The parsing module 1032 can retrieve an application description from the computer-readable medium 1002 (e.g., within the applications 1034) or can retrieve an application description for parsing from an external source accessible using the wireless circuitry 1008. Application types can be provided by the parsing module 1032 to the affinity module 1026. In some embodiments, the parsing module 1032 can parse other types of content. For instance, a digital receipt can be parsed to determine an attribute of a particular location (e.g., the type of merchant).

The content module 1036 can assist with retrieving and/or generating content related to a type of application. Such content can be stored internally (e.g., in the computer-readable medium 1002), or can also be retrieved from an external storage location or data feed using the wireless circuitry 1008. The content module 1034 can transmit content to the I/O subsystem 1006 and/or the audio circuitry 1010 so that the content can be presented to a user.

The one or more applications 1036 on the mobile device 1000 can include any applications installed on the mobile device 1000, including without limitation, message applications (e.g., e-mail, SMS, voice, etc.), web browsers, calendar applications, news applications, games applications, media playback and/or editing applications, social network applications, productivity application, sports applications, travel applications, weather applications, surf forecast applications, entertainment applications, photo editing applications, utility applications, map applications, word processors, text editors, search engine interfaces, source code editors, database query tools, command line interpreters, and the like The I/O subsystem 1006 can be coupled to a display system (not shown), which can be a touch-sensitive display. The display can provide visual output to the user in a GUI. Such a GUI may be rendered by a graphics module (not shown). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, the I/O subsystem 1006 can include a display and user input devices such as a keyboard, mouse, and/or trackpad. In some embodiments, the I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the computer-readable medium 1002) can detect contact (and any movement or release of the contact) on the touch-sensitive display and can convert the detected contact into interaction with user-interface objects, such as one or more soft keys, that are displayed on the touch-sensitive display when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem 1006 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications, and the like. In some embodiments, in addition to the touch-sensitive display, the mobile device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Advantages that may be provided by certain embodiments of the invention include providing recommendations and other personalized content tailored to a particular user. Despite the many functionalities provided by applications on a mobile device, the user experience may be limited by the fact the mobile devices generally do not take into account a user's historical interaction with such application. Information such as a user's preferences and habits can be gleaned from past user interactions in combination with contextual information such as the time and/or location at which user interactions with applications occur. By recognizing such usage patterns and providing personalized content accordingly, users can be provided with relevant information automatically, i.e. with requiring that the user to manually interact with an application to obtain the information. Personalized content such as recommendations may further inform the user of applications, products, functionalities of their mobile device, and other information that the user would have otherwise been unaware of.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

A recitation of "a", "an" or "the" is intended to mean "one or more" unless specifically indicated to the contrary.

Although the invention has been described with respect to specific embodiments, it will be appreciated that the invention is intended to cover all modifications and equivalents within the scope of the following claims.

What is claimed is:

1. A method for providing personalized content based on historical interaction with a mobile device, the method comprising:
receiving, by a computing device, information about a user interaction with an application running on the mobile device at a first time;
identifying a type of the application by parsing a description of the application;
determining a first location of the mobile device, the mobile device being at the first location at the first time;
generating an affinity model that associates the type of the application with the first location;
determining, at a second time, that a second location of the mobile device corresponds to the first location, the mobile device being at the second location at the second time;
determining, using the affinity model, that the second location is associated with the type of the application based on the correspondence of the second location to the first location; and
providing, to the mobile device, content related to the type of the application,
wherein the determining, using the affinity model, that the second location is associated with the type of the application comprises:
determining a confidence value that the second location is associated with the type of the application;
comparing the confidence value against a threshold value; and
determining that the confidence value exceeds the threshold value.

2. The method of claim 1, wherein:
the mobile device includes the computing device; or
the computing device is a remote server computer.

3. The method of claim 1, wherein the description of the application is parsed using a natural language processing algorithm.

4. The method of claim 1, wherein determining that the second location corresponds to the first location comprises determining that the second location and the first location are the same location.

5. The method of claim 1, wherein determining that the second location corresponds to the first location comprises determining that the second location and the first location share a common attribute.

6. The method of claim 1, further comprising:
providing, to the mobile device, a concept tag corresponding to the type of the application and a concept tag corresponding to the first location of the mobile device, wherein generating the affinity model that associates the type of the application with the first location includes associating the concept tag corresponding to the type of the application with the concept tag corresponding to the first location in the affinity model.

7. The method of claim 6, wherein determining that the second location of the mobile device corresponds to the first location includes determining that the concept tag corresponding to the first location also corresponds to the second location.

8. The method of claim 7, further comprising:
assigning a counter to the association of the concept tag corresponding to the type of the application with the concept tag corresponding to the first location;
incrementing the counter in response to receiving the information about the user interaction with the application of the identified type at the first location; and
providing the content related to the type of the application in response to determining that:
the concept tag corresponding to the first location also corresponds to the second location; and
the counter meets or exceeds a threshold value.

9. The method of claim 1, wherein the generated affinity model further associates the type of the application with the first time, and wherein the method further comprises:
determining that the second time corresponds to the first time; and
determining, using the affinity model, that the second time is associated with the type of the application based on the correspondence of the second time to the first time.

10. A method for providing personalized content based on historical interaction with a user device, the method comprising:

receiving, by a computing device, information about a user interaction with an application running on the user device at a first time;

identifying a type of the application by parsing a description of the application;

generating an affinity model that associates the type of the application with the first time, the affinity model being stored on the computing device;

determining, at a second time, that the second time corresponds to the first time;

determining, using the affinity model, that the second time is associated with the type of the application based on the correspondence of the second time to the first time; and providing, to the user device, content related to the type of the application, wherein the determining, using the affinity model, that the second time is associated with the type of the application comprises:

determining a confidence value that the second time is associated with the type of the application;

comparing the confidence value against a threshold value; and determining that the confidence value exceeds the threshold value.

11. The method of claim 10, wherein:
the user device includes the computing device; or
the computing device is a remote server computer.

12. The method of claim 10, wherein the description of the application is parsed using a natural language processing algorithm.

13. The method of claim 10, wherein the first time and the second time comprise at least one of: a time of day, a day of the week, a month, a date, a season, and a holiday.

14. The method of claim 10, wherein the determining that the second time corresponds to the first time comprises determining that the second time and the first time are the same time.

15. The method of claim 10, further comprising:
providing, to the user device, a concept tag corresponding to the type of the application and a concept tag corresponding to the first time, wherein generating the affinity model that associates the type of the application with the first time includes associating the concept tag corresponding to the type of the application with the concept tag corresponding to the first time.

16. The method of claim 15, wherein determining that the second time corresponds to the first time includes determining that the concept tag corresponding to the first time also corresponds to the second time.

17. The method of claim 16, further comprising:
assigning a counter to the association of the concept tag corresponding to the type of the application with the concept tag corresponding to the first time;
incrementing the counter in response to receiving the information about the user interaction with the application of the identified type at the first time; and
providing the content related to the type of the application in response to determining that:
    the concept tag corresponding to the first time also corresponds to the second time; and
    the counter meets or exceeds a threshold value.

18. The method of claim 10, further comprising:
determining a first location, the user device being at the first location at the first time, wherein the generated affinity model further associates the type of the application with the first location;

determining, at the second time, that a second location of the user device corresponds to the first location, the user device being at the second location at the second time; and determining, using the affinity model, that the second location is associated with the type of the application based on the correspondence of the second location to the first location.

19. A computer product comprising a non-transitory computer readable medium storing a plurality of instructions that when executed control a computing device to provide personalized content based on historical interaction with a mobile device, the instructions comprising:

receiving information about a user interaction with an application running on the mobile device at a first time;

identifying a type of the application by parsing a description of the application;

determining a first location of the mobile device, the mobile device being at the first location at the first time;

generating an affinity model that associates the type of the application with the first location and the first time;

determining, at a second time, that a second location of the mobile device corresponds to the first location and that the second time corresponds to the first time, the mobile device being at the second location at the second time;

determining, using the affinity model, that:
    the second location is associated with the type of the application based on the correspondence of the second location to the first location; and
    the second time is associated with the type of the application based on the correspondence of the second time to the first time; and providing, to the mobile device, content related to the type of the application, wherein the determining, using the affinity model, that the second time is associated with the type of the application comprises:

determining a confidence value that the second time is associated with the type of the application;

comparing the confidence value against a threshold value; and determining that the confidence value exceeds the threshold value.

20. The computer product of claim 19, wherein:
the mobile device includes the computing device; or
the computing device is a remote server computer.

21. The computer product of claim 19, wherein the description of the application is parsed using a natural language processing algorithm.

22. The computer product of claim 19, wherein determining that the second location corresponds to the first location comprises determining that the second location and the first location are the same location.

23. The computer product of claim 19, wherein determining that the second location corresponds to the first location comprises determining that the second location and the first location share a common attribute.

24. The computer product of claim 19, wherein the first time and the second time comprise at least one of: a time of day, a day of the week, a month, a date, a season, and a holiday.

25. The computer produce of claim 19, wherein the instructions further comprise:
providing, to the mobile device, a concept tag corresponding to the type of the application, a concept tag corresponding to the first location of the mobile device, and a concept tag corresponding to the first time, wherein generating the affinity model that associates the type of the application with the first location and the first time includes associating the concept tag corresponding to the type of the application, the concept tag corresponding to the first location, and the concept tag corresponding to the first time with each other.

26. The computer product of claim 25, wherein determining that the second location of the mobile device corresponds to the first location includes determining that the concept tag corresponding to the first location also corresponds to the second location, and wherein determining that the second time corresponds to the first time includes determining that the concept tag corresponding to first time also corresponds to the second time.

27. The computer product of claim 26, wherein the instructions further comprise:
   assigning a counter to the association of the concept tag corresponding to the type of the application, the concept tag corresponding to the first location, and the concept tag corresponding to the first time with each other;
   incrementing the counter in response to receiving the information about the user interaction with the application of the identified type at the first location and first time; and
   providing the content related to the type of the application in response to determining that:
      the concept tag corresponding to the first location also corresponds to the second location;
      the concept tag corresponding to the first time also corresponds to the second time; and
      the counter meets or exceeds a threshold value.

* * * * *